(12) United States Patent
Chen

(10) Patent No.: US 10,999,003 B2
(45) Date of Patent: May 4, 2021

(54) DATA PROCESSING METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/817,859

(22) Filed: Mar. 13, 2020

(65) Prior Publication Data

US 2020/0213033 A1    Jul. 2, 2020

Related U.S. Application Data

(63) Continuation of application No. PCT/CN2017/101601, filed on Sep. 13, 2017.

(51) Int. Cl.
*H04L 1/00* (2006.01)
*H04L 5/14* (2006.01)
*H04W 72/04* (2009.01)

(52) U.S. Cl.
CPC .......... *H04L 1/0016* (2013.01); *H04L 1/0003* (2013.01); *H04L 1/0009* (2013.01); *H04L 1/0025* (2013.01); *H04W 72/042* (2013.01)

(58) Field of Classification Search
CPC ... H04L 1/0016; H04L 1/0009; H04L 1/0029; H04L 1/0002; H04L 1/0004;
(Continued)

(56) References Cited

U.S. PATENT DOCUMENTS

2011/0019776 A1    1/2011  Zhang et al.
2012/0019776 A1    1/2012  Giraudet
(Continued)

FOREIGN PATENT DOCUMENTS

CN    103973403    8/2014
CN    104052572    9/2014
(Continued)

OTHER PUBLICATIONS

WIPO, ISR for PCT/CN2017/101601, dated Dec. 26, 2017.
(Continued)

*Primary Examiner* — Jae Y Lee
*Assistant Examiner* — Aixa A Guadalupe Cruz
(74) *Attorney, Agent, or Firm* — Hodgson Russ LLP

(57) ABSTRACT

A data processing method includes: obtaining, by a terminal device, a downlink control information (DCI), wherein the DCI comprises: a DCI format and a MCS indication information; determining, by the terminal device according to the MCS indication information and a MCS mapping table, a MCS, wherein the MCS mapping table is obtained according to a first DCI format and a modulation coding scheme (MCS) mapping table; wherein the MCS mapping table comprises a mapping relationship between multiple MCS indication information and multiple MCSs comprising 256 QAM modulation scheme; and processing, by the terminal device according to the MCS.

14 Claims, 4 Drawing Sheets

(58) Field of Classification Search
CPC ........... H04L 27/361; H04L 2025/0342; H04L 1/0067; H04L 5/1453; H04L 1/0046
See application file for complete search history.

(56) References Cited

U.S. PATENT DOCUMENTS

| | | | | |
|---|---|---|---|---|
| 2014/0192732 | A1* | 7/2014 | Chen | H04L 1/0003 370/329 |
| 2015/0215068 | A1* | 7/2015 | Wu | H04L 1/0016 370/329 |
| 2015/0289237 | A1* | 10/2015 | Kim | H04L 5/0094 370/329 |
| 2015/0312082 | A1* | 10/2015 | Shin | H04L 1/0026 370/329 |
| 2016/0036618 | A1* | 2/2016 | Einhaus | H04W 72/1263 370/329 |
| 2016/0337150 | A1* | 11/2016 | Larsson | H04L 1/0026 |

FOREIGN PATENT DOCUMENTS

| | | |
|---|---|---|
| CN | 105164961 | 12/2015 |
| RU | 2284591 | 9/2006 |
| WO | 2012036077 | 3/2012 |
| WO | 2014166820 | 10/2014 |
| WO | 2015034151 | 3/2015 |

OTHER PUBLICATIONS

EPO, Extended European Search Report for EP Application No. 17925273.9, dated Aug. 11, 2020.

ZTE et al., "On CQI and MCS," 3GPP TSG RAN WG1 Meeting NR #3, R1-1715442, Sep. 2017, 9 pages.

Intel Corporation, "Discussion on standardization impacts of UL 256QAM," 3GPP TSG-RAN WG1 #84bis, R1-162372, Apr. 2016, 3 pages.

Huawei et al., "CQI and MCS design," 3GPP TSG RAN WG1 Meeting AH NRr#3, R1-1715469, Sep. 2017, 2 pages.

Intel Corporation, "CQI and MCS Design for NR," 3GPP TSG RAN WG1 Meeting NR #3, R1-1716296, Sep. 2017, 6 pages.

"LTE; Evolved Universal Terrestrial Radio Access (E-UTRA); Physical layer procedures (3GPP TS 36.213 version 13.0.0 Release 13)," ETSI TS 136 213, May 2016, v13.0.0, 327 pages.

FSIP, Office Action for RU Application No. 2020113266/07, Nov. 5, 2020.

* cited by examiner

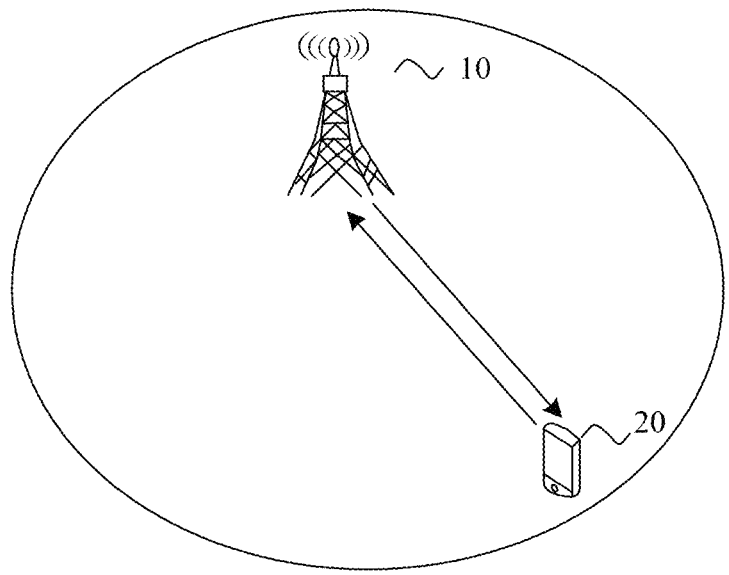

A terminal device selects, according to transmission parameters used in transmitting first data, an MCS mapping relationship table to be used, wherein the MCS mapping relationship table comprises a mapping relationship between multiple pieces of MCS indication information and multiple MCSs  /  210

The terminal device determines, according to a target MCS indication information carried in a DCI and the MCS mapping relationship table, a target MCS for data processing of the first data  /  220

The terminal device performs, according to the target MCS, coding and modulation of the first data or demodulation and decoding of the first data  /  230

A network device selects, according to a transmission parameter used for transmitting the first data, an MCS mapping table to be used, the MCS mapping table including a mapping relationship between multiple MCS indication information and multiple MCSs — 310

The network device determines, according to the MCS mapping table and a target MCS used for performing data processing on the first data, target MCS indication information carried in the DCI — 320

The network device sends the DCI carrying the target MCS indication information to a terminal device — 330

The network device performs, according to the target MCS, encoding and modulation, or demodulation and decoding, on the first data — 340

FIG. 3

DATA PROCESSING METHOD, TERMINAL DEVICE AND NETWORK DEVICE

CROSS-REFERENCE TO RELATED APPLICATION

This application is a continuation application of PCT Application No. PCT/CN2017/101601, filed Sep. 13, 2017, the entire disclosure of which is incorporated herein by reference.

TECHNICAL FIELD

The present application relates to the field of wireless communication, and more particularly, to a data processing method, a terminal device and a network device.

BACKGROUND

In the 5G New Radio (NR) system, two new modulation methods are introduced: binary phase shift keying (BPSK) with pi/2 offset and 256 quadrature amplitude modulation (QAM). Moreover, other higher-order modulation methods, such as 1024 QAM, will be supported in subsequent evolutions.

Among them, BPSK with pi/2 offset is used in the scenario with very low signal-to-noise ratio. In this case, the terminal can use a multiple access method based on discrete Fourier transform spread orthogonal frequency division multiplexing (DFT-S-OFDM). The 256QAM is mainly used in the scenario with a high signal-to-noise ratio. In this case, the terminal can adopt a multiple access method based on cyclic prefix orthogonal frequency division multiplexing (CP-OFDM). Since the application scenarios of these modulation methods are different, how to select the modulation and coding method becomes an urgent problem to be solved.

SUMMARY

Embodiments of the present application provide a data processing method, a terminal device and a network device, so as to effectively determine the modulation coding scheme to be used in different transmission scenarios.

According to a first aspect, there is provided a data processing method, including: selecting, by a terminal device according to a transmission parameter used for transmitting first data, a modulation coding scheme (MCS) mapping table to be used, the MCS mapping table including a mapping relationship between multiple MCS indication information and multiple MCSs, the transmission parameter including at least one of: a transmission pattern used for transmitting the first data, a downlink control information (DCI) format of DCI used for scheduling the first data, a subcarrier spacing used for transmitting the first data, or a multiplexing manner of the first data and uplink control information (UCI); determining, by the terminal device according to target MCS indication information carried in the DCI and the MCS mapping table, a target MCS used for performing data processing on the first data; and performing, by the terminal device according to the target MCS, encoding and modulation, or demodulation and decoding, on the first data.

Therefore, the terminal device is able to select an MCS mapping table suitable for the current transmission scenario according to transmission parameters of the data transmission, such as a transmission pattern, a DCI format, a subcarrier spacing, a multiplexing manner with the UCI, and the like, and effectively determine the MCS used in the current transmission scenario according to the MCS indication information carried in the DCI and the selected MCS mapping table.

In one embodiment, each of the multiple MCS indication information indicates an MCS index, and multiple MCS indexes indicated by the multiple MCS indication information correspond to the multiple MCSs one-to-one.

In one embodiment, each of the multiple MCSs includes information of a modulation scheme and an encoding rate.

In one embodiment, the transmission parameter includes the transmission pattern used for transmitting the first data, and before the selecting, by a terminal device according to a transmission parameter used for transmitting first data, an MCS mapping table to be used, the method further includes: receiving, by the terminal device, indication information that is sent by a network device using high layer signaling and used for indicating the transmission pattern.

In one embodiment, the transmission parameter includes the DCI format of DCI used for scheduling the first data, and before the selecting, by a terminal device according to a transmission parameter used for transmitting first data, an MCS mapping table to be used, the method further includes: performing, by the terminal device based on multiple DCI formats, blind detection on the DCI to determine the DCI format of the DCI.

In one embodiment, the transmission pattern used for transmitting the first data includes any one of: a transmission pattern based on a single antenna port, a transmission pattern based on multiple input multiple output (MIMO), a transmission pattern based on multiple antenna ports, a transmission pattern based on a single transmission point, or a transmission pattern based on multiple transmission points.

In one embodiment, the DCI format of DCI used for scheduling the first data includes a DCI format used for scheduling any kind of data transmission including: data transmission on a single antenna port, data transmission at a single transmission layer, data transmission on multiple antenna ports, data transmission at multiple transmission layers, data transmission based on open-loop MIMO, data transmission based on closed-loop precoding, data transmission based on a multiple access mode of discrete Fourier transform spread orthogonal frequency division multiplexing (DFT-S-OFDM), data transmission based on a multiple access mode of cyclic prefix orthogonal frequency division multiplexing (CP-OFDM), data transmission at a single transmission point, or data transmission at multiple transmission points.

In one embodiment, the transmission parameter includes the transmission pattern used for transmitting the first data, if the transmission pattern is a first transmission pattern, a first modulation scheme is included in the multiple MCSs in the MCS mapping table selected by the terminal device; and if the transmission pattern is a second transmission pattern, the first modulation scheme is not included in the multiple MCSs in the MCS mapping table selected by the terminal device.

In one embodiment, the first transmission pattern is a transmission pattern based on a single antenna port, the second transmission pattern is a transmission pattern based on multiple antenna ports, and the first modulation scheme is binary phase shift keying (BPSK) with pi/2 offset; or the first transmission pattern is a transmission pattern based on multiple antenna ports, the second transmission pattern is a transmission pattern based on a single antenna port, and the first modulation scheme is a modulation scheme with a modulation order higher than 64 quadrature amplitude modulation (QAM); or the first transmission pattern is a transmission pattern based on a single transmission point, the second transmission pattern is a transmission pattern based on multiple transmission points, and the first modulation scheme is a modulation scheme with a modulation order higher than 64 QAM.

In one embodiment, the transmission parameter includes the DCI format of DCI used for scheduling the first data, if the DCI format of DCI is a first DCI format, a second modulation scheme is included in the multiple MCSs in the MCS mapping table selected by the terminal device; and if the DCI format of DCI is a second DCI format, the second modulation scheme is not included in the multiple MCSs in the MCS mapping table selected by the terminal device.

In one embodiment, the first DCI format is used for scheduling single-layer data transmission on a single antenna port, the second DCI format is used for scheduling single-layer or multi-layer data transmission on multiple antenna ports, and the second modulation scheme is a BPSK modulation scheme with pi/2 offset; or the first DCI format is used for scheduling data transmission based on a multiple access mode of DFT-S-OFDM, the second DCI format is used for scheduling data transmission based on a multiple access mode of CP-OFDM, and the second modulation scheme is the BPSK modulation scheme with pi/2 offset; or the first DCI format is used for scheduling data transmission based on a multiple access mode of CP-OFDM, the second DCI format is used for scheduling data transmission based on a multiple access mode of DFT-S-OFDM, and the second modulation scheme is a modulation scheme with 64 QAM.

In one embodiment, the transmission parameter includes the transmission pattern used for transmitting the first data and the DCI format of DCI used for scheduling the first data, if the transmission pattern is a third transmission pattern and the DCI format of DCI is a third DCI format, a third modulation scheme is included in the multiple MCSs in the MCS mapping table selected by the terminal device; and if the transmission pattern is not the third transmission pattern and/or the DCI format of DCI is not the third DCI format, the third modulation scheme is not included in the multiple MCSs in the MCS mapping table selected by the terminal device.

In one embodiment, the third transmission pattern is a transmission pattern based on MIMO, the third DCI format is used for scheduling data transmission on multiple antenna ports, and the third modulation scheme is a modulation scheme with 256 QAM; or the third transmission pattern is a transmission pattern based on a single antenna port, the third DCI format is used for scheduling data transmission based on a multiple access mode of DFT-S-OFDM, and the third modulation scheme is a BPSK modulation scheme with pi/2 offset.

In one embodiment, the transmission parameter includes the transmission pattern used for transmitting the first data and the DCI format of DCI used for scheduling the first data, if the transmission pattern is a fourth transmission pattern and the DCI format of DCI is a fourth DCI format, a fourth modulation scheme is not included in the multiple MCSs in the MCS mapping table selected by the terminal device; if the transmission pattern is not the fourth transmission pattern and/or the DCI format of DCI is not the fourth DCI format, the fourth modulation scheme is included in the multiple MCSs in the MCS mapping table selected by the terminal device.

In one embodiment, the fourth transmission pattern is a transmission pattern based on a single antenna port, the fourth DCI format is used for scheduling data transmission based on a multiple access mode of DFT-S-OFDM, and the fourth modulation scheme is a modulation scheme with 256 QAM; or the fourth transmission pattern is a transmission pattern based on MIMO, the fourth DCI format is used for scheduling data transmission based on a multiple access mode of CP-OFDM, and the fourth modulation scheme is a BPSK modulation scheme with pi/2 offset.

In one embodiment, the transmission parameter includes the multiplexing manner of the first data and uplink control information (UCI), if the multiplexing manner is that the first data is multiplexed with the UCI in a same time domain resource unit, or the first data is frequency-division multiplexed (FDM) with the UCI, a fifth modulation scheme is not included in the multiple MCSs in the mapping table selected by the terminal device.

In one embodiment, the fifth modulation scheme includes any one of: BPSK with pi/2 offset, 64 QAM, 256 QAM or 1024 QAM.

In one embodiment, a MCS mapping table selected by the terminal device according to a transmission parameter is different from a MCS mapping table selected by the terminal device according to a different transmission parameter, and in different mapping tables, the target MCS indication information corresponds to different coding rates.

In one embodiment, a MCS mapping table selected by the terminal device according to a transmission parameter is different from a MCS mapping table selected by the terminal device according to a different transmission parameter, and the different mapping tables include different numbers of MCS indication information.

In one embodiment, the performing, by the terminal device according to the target MCS, encoding and modulation, or demodulation and decoding, on the first data includes: performing, by the terminal device if the target MCS exceeds a maximum MCS supported by the terminal device, encoding and modulation, or demodulation and decoding, on the first data according to the maximum MCS.

According to a second aspect, there is provided a data processing method, including: selecting, by a network device according to a transmission parameter used for transmitting first data, a modulation coding scheme (MCS) mapping table to be used, the MCS mapping table including a mapping relationship between multiple MCS indication information and multiple MCSs, the transmission parameter including at least one of: a transmission pattern used for transmitting the first data, a downlink control information (DCI) format of DCI used for scheduling the first data, a subcarrier spacing used for transmitting the first data, or a multiplexing manner of the first data and uplink control information (UCI); determining, by the network device according to the MCS mapping table and a target MCS used for performing data processing on the first data, target MCS indication information carried in the DCI; sending, by the network device, the DCI carrying the target MCS indication information to a terminal device; and performing, by the network device according to the target MCS, encoding and modulation, or demodulation and decoding, on the first data.

Therefore, the network device is able to select an MCS mapping table suitable for the current transmission scenario according to transmission parameters of the data transmission, such as a transmission pattern, a DCI format, a subcarrier spacing, a multiplexing manner with the UCI, and the like, and determine the MCS indication information to be sent according to the target MCS used for performing data processing on the first data and the selected MCS mapping table, thereby enabling the terminal device to effectively determine the MCS to be used in the current transmission scenario according to the MCS indication information.

In one embodiment, each of the multiple MCS indication information indicates an MCS index, and multiple MCS indexes indicated by the multiple MCS indication information correspond to the multiple MCSs one-to-one.

In one embodiment, each of the multiple MCSs includes information of a modulation scheme and an encoding rate.

In one embodiment, the transmission pattern used for transmitting the first data includes any one of: a transmission pattern based on a single antenna port, a transmission pattern based on multiple input multiple output (MIMO), a transmission pattern based on multiple antenna ports, a transmission pattern based on a single transmission point, or a transmission pattern based on multiple transmission points.

In one embodiment, the DCI format of DCI used for scheduling the first data includes a DCI format used for scheduling any kind of data transmission including: data transmission on a single antenna port, data transmission at a single transmission layer, data transmission on multiple antenna ports, data transmission at multiple transmission layers, data transmission based on open-loop MIMO, data transmission based on closed-loop precoding, data transmission based on a multiple access mode of discrete Fourier transform spread orthogonal frequency division multiplexing (DFT-S-OFDM), data transmission based on a multiple access mode of cyclic prefix orthogonal frequency division multiplexing (CP-OFDM), data transmission at a single transmission point, or data transmission at multiple transmission points.

In one embodiment, the transmission parameter includes the transmission pattern used for transmitting the first data, if the transmission pattern is a first transmission pattern, a first modulation scheme is included in the multiple MCSs in the MCS mapping table selected by the network device; and if the transmission pattern is a second transmission pattern, the first modulation scheme is not included in the multiple MCSs in the MCS mapping table selected by the network device.

In one embodiment, the first transmission pattern is a transmission pattern based on a single antenna port, the second transmission pattern is a transmission pattern based on multiple antenna ports, and the first modulation scheme is binary phase shift keying (BPSK) with pi/2 offset; or the first transmission pattern is a transmission pattern based on multiple antenna ports, the second transmission pattern is a transmission pattern based on a single antenna port, and the first modulation scheme is a modulation scheme with a modulation order higher than 64 quadrature amplitude modulation (QAM); or the first transmission pattern is a transmission pattern based on a single transmission point, the second transmission pattern is a transmission pattern based on multiple transmission points, and the first modulation scheme is a modulation scheme with a modulation order higher than 64 QAM.

In one embodiment, the transmission parameter includes the DCI format of DCI used for scheduling the first data, if the DCI format of DCI is a first DCI format, a second modulation scheme is included in the multiple MCSs in the MCS mapping table selected by the network device; and if the DCI format of DCI is a second DCI format, the second modulation scheme is not included in the multiple MCSs in the MCS mapping table selected by the network device.

In one embodiment, the first DCI format is used for scheduling single-layer data transmission on a single antenna port, the second DCI format is used for scheduling single-layer or multi-layer data transmission on multiple antenna ports, and the second modulation scheme is a BPSK modulation scheme with pi/2 offset; or the first DCI format is used for scheduling data transmission based on a multiple access mode of DFT-S-OFDM, the second DCI format is used for scheduling data transmission based on a multiple access mode of CP-OFDM, and the second modulation scheme is the BPSK modulation scheme with pi/2 offset; or the first DCI format is used for scheduling data transmission based on a multiple access mode of CP-OFDM, the second DCI format is used for scheduling data transmission based on a multiple access mode of DFT-S-OFDM, and the second modulation scheme is a modulation scheme with 64 QAM.

In one embodiment, the transmission parameter includes the transmission pattern used for transmitting the first data and the DCI format of DCI used for scheduling the first data, if the transmission pattern is a third transmission pattern and the DCI format of DCI is a third DCI format, a third modulation scheme is included in the multiple MCSs in the MCS mapping table selected by the network device; and if the transmission pattern is not the third transmission pattern and/or the DCI format of DCI is not the third DCI format, the third modulation scheme is not included in the multiple MCSs in the MCS mapping table selected by the network device.

In one embodiment, the third transmission pattern is a transmission pattern based on MIMO, the third DCI format is used for scheduling data transmission on multiple antenna ports, and the third modulation scheme is a modulation scheme with 256 QAM; or the third transmission pattern is a transmission pattern based on a single antenna port, the third DCI format is used for scheduling data transmission based on a multiple access mode of DFT-S-OFDM, and the third modulation scheme is a BPSK modulation scheme with pi/2 offset.

In one embodiment, the transmission parameter includes the transmission pattern used for transmitting the first data and the DCI format of DCI used for scheduling the first data, if the transmission pattern is a fourth transmission pattern and the DCI format of DCI is a fourth DCI format, a fourth modulation scheme is not included in the multiple MCSs in the MCS mapping table selected by the network device; if the transmission pattern is not the fourth transmission pattern and/or the DCI format of DCI is not the fourth DCI format, the fourth modulation scheme is included in the multiple MCSs in the MCS mapping table selected by the network device.

In one embodiment, the fourth transmission pattern is a transmission pattern based on a single antenna port, the fourth DCI format is used for scheduling data transmission based on a multiple access mode of DFT-S-OFDM, and the fourth modulation scheme is a modulation scheme with 256 QAM; or the fourth transmission pattern is a transmission pattern based on MIMO, the fourth DCI format is used for scheduling data transmission based on a multiple access mode of CP-OFDM, and the fourth modulation scheme is a BPSK modulation scheme with pi/2 offset.

In one embodiment, the transmission parameter includes the multiplexing manner of the first data and uplink control information (UCI), if the multiplexing manner is that the first data is multiplexed with the UCI in a same time domain resource unit, or the first data is frequency-division multiplexed (FDM) with the UCI, a fifth modulation scheme is not included in the multiple MCSs in the mapping table selected by the network device.

In one embodiment, the fifth modulation scheme includes any one of: BPSK with pi/2 offset, 64 QAM, 256 QAM or 1024 QAM.

In one embodiment, a MCS mapping table selected by the terminal device according to a transmission parameter is different from a MCS mapping table selected by the terminal device according to a different transmission parameter, and in different mapping tables, the target MCS corresponds to different coding rates.

In one embodiment, a MCS mapping table selected by the terminal device according to a transmission parameter is different from a MCS mapping table selected by the terminal device according to a different transmission parameter, and the different mapping tables include different numbers of MCS indication information.

In one embodiment, the performing, by the network device according to the target MCS, encoding and modulation, or demodulation and decoding, on the first data includes: performing, by the network device if the target MCS exceeds a maximum MCS supported by the terminal device, encoding and modulation, or demodulation and decoding, on the first data according to the maximum MCS.

According a third aspect, there is provided a terminal device, which can perform the operations of the terminal device in the above first aspect or any optional embodiment thereof. In one embodiment, the terminal device may include any modular unit for performing the operations of the terminal device in the above first aspect or any optional embodiment thereof.

According a fourth aspect, there is provided a network device, which can perform the operations of the network device in the above second aspect or any optional embodiment thereof. In one embodiment, the network device may include any modular unit for performing the operations of the network device in the above second aspect or any optional embodiment thereof.

According to a fifth aspect, there is provided a terminal device including: a processor, a transceiver, and a memory. The processor, the transceiver, and the memory communicate with each other through an internal connection path. The memory is configured to store instructions, and the processor is configured to execute the instructions stored by the memory. When the processor executes the instructions stored by the memory, the execution causes the terminal device to perform the method in the first aspect or any possible embodiment thereof, or the execution causes the terminal device to implement the terminal device provided according to the third aspect.

According to a sixth aspect, there is provided a network device including: a processor, a transceiver, and a memory. The processor, the transceiver, and the memory communicate with each other through an internal connection path. The memory is configured to store instructions, and the processor is configured to execute the instructions stored by the memory. When the processor executes the instructions stored by the memory, the execution causes the network device to perform the method in the second aspect or any possible embodiment thereof, or the execution causes the network device to implement the network device provided according to the fourth aspect.

According to a seventh aspect, there is provided a computer readable storage medium storing a program, the program causing a terminal device to perform the data processing method in the first aspect or any possible embodiment thereof.

According to an eighth aspect, there is provided a computer readable storage medium storing a program, the program causing a network device to perform the data processing method in the first aspect or any possible embodiment thereof.

According to a ninth aspect, there is provided a system chip including an input interface, an output interface, a processor, and a memory, the processor is configured to execute instructions stored by the memory, and when the instructions are executed, the processor is able to implement the method in the first aspect or any possible embodiment thereof.

According to a tenth aspect, there is provided a system chip including an input interface, an output interface, a processor, and a memory, the processor is configured to execute instructions stored by the memory, and when the instructions are executed, the processor is able to implement the method in the second aspect or any possible embodiment thereof.

According to an eleventh aspect, there is provided a computer program product including instructions, and the computer program product, when running on a computer, causes the computer to perform the method in the first aspect or any possible embodiment thereof.

According to a twelfth aspect, there is provided a computer program product including instructions, and the computer program product, when running on a computer, causes the computer to perform the method in the second aspect or any possible embodiment thereof.

BRIEF DESCRIPTION OF THE DRAWINGS

FIG. 1 is a schematic structural diagram illustrating an application scenario of an embodiment of the present application.

FIG. 2 is a schematic flowchart illustrating a data processing method according to an embodiment of the present application.

FIG. 3 is a schematic flowchart illustrating a data processing method according to an embodiment of the present application.

DETAILED DESCRIPTION

Figure 4:
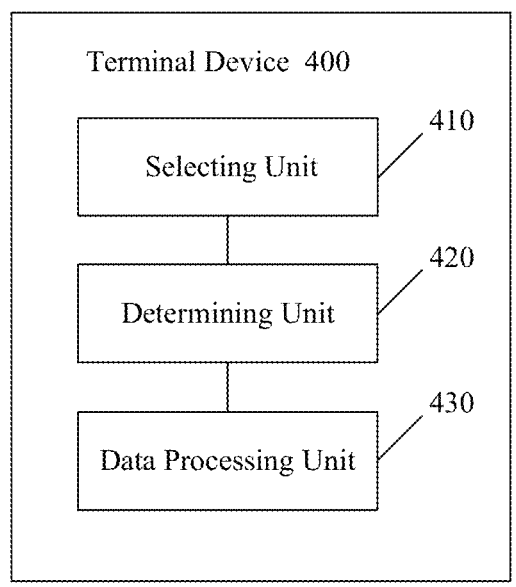
FIG. 4 is a block diagram illustrating a terminal device according to an embodiment of the present application.

The technical solutions in the embodiments of the present application will be described below with reference to the accompanying drawings.

It should be understood that the technical solutions of the embodiments of the present application may be applied to various communication systems, such as a Global System of Mobile Communication (GSM) system, a Code Division Multiple Access (CDMA) system, a Code Division Multiple Access (CDMA) system, a Wideband Code Division Multiple Access (WCDMA) system, a Long Term Evolution (LTE) system, an LTE Frequency Division Duplex (FDD) system, an LTE Time Division Duplex (TDD) system, a Universal Mobile Telecommunication System (UMTS), and future 5G communication systems.

The present application describes various embodiments in connection with a terminal device. The terminal device may also refer to a user equipment (UE), an access terminal, a subscriber unit, a subscriber station, a mobile station, a mobile terminal, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to wireless modems, an in-vehicle device, a wearable device, a terminal device in future 5G network, a terminal device in future evolved land-based public land mobile network (PLMN), or the like.

The present application also describes various embodiments in connection with a network device. The network device may be a device for communicating with the terminal device, for example, may be a Base Transceiver Station (BTS) in the GSM system or CDMA, or may be a NodeB (NB) in the WCDMA system, or may be an Evolutional Node B (eNB or eNodeB) in the LTE system. The network device may also be a relay station, an access point, an in-vehicle device, a wearable device, and a network side device in the future 5G network, a network side device in the future evolved PLMN network, or the like.

FIG. 1 is a schematic structural diagram illustrating an application scenario of an embodiment of the present application. The communication system in FIG. 1 may include a network device 10 and a terminal device 20. The network device 10 is configured to provide communication services for the terminal device 20 and access the core network. The terminal device 20 may access the network by searching for synchronization signals, broadcast signals, and the like transmitted by the network device 10, thereby performing communication with the network. The arrows shown in FIG. 1 may represent uplink/downlink transmissions through a cellular link between the terminal device 20 and the network device 10.

The network in the embodiment of the present application may refer to a Public Land Mobile Network (PLMN), a Device to Device (D2D) network, a Machine to Machine/Man (M2M) network, or other networks, FIG. 1 is only a simplified schematic diagram of an example, and other terminal devices may also be included in the network, which are not shown in FIG. 1.

FIG. 2 is a schematic flowchart illustrating a data processing method according to an embodiment of the present application. The method shown in FIG. 2 may be performed by a terminal device, which may be, for example, the terminal device 20 shown in FIG. 1. As shown in FIG. 2, the data processing method is as follows.

In 210, the terminal device selects, according to a transmission parameter used for transmitting the first data, an MCS mapping table to be used.

In one embodiment, the MCS mapping table includes a mapping relationship between multiple modulation coding scheme (MCS) indication information and multiple MCSs In one embodiment, the transmission parameter includes at least one of: a transmission pattern used for transmitting the first data, a downlink control information (DCI) format of DCI used for scheduling the first data, a subcarrier spacing used for transmitting the first data, or a multiplexing manner of the first data and uplink control information (UCI).

In one embodiment, the terminal device may select, from the multiple MCS mapping table and according to the transmission parameter used for transmitting the first data, the MCS mapping table used for performing data processing on the first data. When the transmission parameters used for transmitting the first data are different, the MCS mapping tables selected by the terminal device may also be different. The MCS mapping table includes a mapping relationship between multiple MCS indication information and multiple MCSs, and the multiple MCS indication information are in one-to-one correspondence with the multiple MCSs. The terminal device may determine, according to MCS indication information carried in the DCI that schedules the first data and the MCS mapping table, the target MCS used for performing data processing on the first data, and perform, according to the target MCS, encoding and modulation, or demodulation and decoding, on the first data.

In one embodiment, each of the multiple MCS indication information in the MSC mapping table indicates an MCS index, and multiple MCS indexes indicated by the multiple MCS indication information correspond to the multiple MCSs one-to-one.

In one embodiment, each of the multiple MCSs includes information of a modulation scheme and an encoding rate.

For example, the MCS mapping table shown in Table 1 includes 32 MCS indexes, and the 32 MCS indexes respectively correspond to 32 kinds of modulation coding scheme, and each modulation coding scheme includes a code rate and a modulation scheme, such as a modulation scheme of quadrature phase shift keying (QPSK) or a modulation scheme of 64 QAM.

TABLE 1

| MCS index indicated by the MCS indication information | Modulation Scheme | Code Rate (R × 1024) |
| --- | --- | --- |
| 0 | QPSK | 102 |
| 1 | QPSK | 256 |
| 2 | QPSK | 341 |
| 3 | QPSK | 512 |
| 4 | QPSK | 683 |
| ... | ... | ... |
| 30 | 64 QAM | 768 |
| 31 | 64 QAM | 819 |

In one embodiment, the transmission parameter includes the transmission pattern used for transmitting the first data, and the method, before 210, that is, before the selecting, by the terminal device according to the transmission parameter used for transmitting first data, the MCS mapping table to be used, further includes: receiving, by the terminal device, indication information that is sent by a network device using high layer signaling and used for indicating the transmission pattern.

In one embodiment, the transmission parameter includes the DCI format of DCI used for scheduling the first data, and the method, before 210, that is, before the selecting, by the terminal device according to the transmission parameter used for transmitting first data, the MCS mapping table to be used, further includes: performing, by the terminal device based on multiple DCI formats, blind detection on the DCI to determine the DCI format of the DCI.

The multiple DCI formats and the number of the multiple DCI formats that require blind detection by the terminal device may depend on, for example, the transmission pattern used for transmitting the first data as currently configured.

In one embodiment, the transmission pattern used for transmitting the first data includes any one of: a transmission pattern based on a single antenna port, a transmission pattern based on multiple input multiple output (MIMO), a transmission pattern based on multiple antenna ports, a transmission pattern based on a single transmission point, or a transmission pattern based on multiple transmission points.

In one embodiment, the transmission point may be, for example, a transmission reception point (TRP) or an antenna panel. For a transmission pattern based on a single transmission point, the terminal device only needs a single physical downlink control channel (PDCCH) to obtain the DCI carried on the single PDCCH; and for a transmission pattern based on multiple transmission points, the terminal device needs to detect multiple PDCCHs.

In one embodiment, the DCI format of DCI used for scheduling the first data includes a DCI format used for scheduling any kind of data transmission as follows: data transmission on a single antenna port, data transmission at a single transmission layer, data transmission on multiple antenna ports, data transmission at multiple transmission layers, data transmission based on open-loop MIMO, data transmission based on closed-loop precoding, data transmission based on a multiple access mode of discrete Fourier transform spread orthogonal frequency division multiplexing (DFT-S-OFDM), data transmission based on a multiple access mode of cyclic prefix orthogonal frequency division multiplexing (CP-OFDM), data transmission at a single transmission point, or data transmission at multiple transmission points.

For example, the DCI format used for scheduling any of the above data transmissions may be independent of the transmission pattern, and the DCI format may be a DCI format having attributes for scheduling any of the above data transmissions.

In one embodiment, the open-loop MIMO may be, for example, transmit diversity, precoding rotation, or open-loop spatial multiplexing. The transmission point may be, for example, a TRP or a panel.

In one embodiment, if the DCI format of the DCI is used for scheduling data transmission on a single transmission point, the terminal device only needs to detect a single PDCCH; if the DCI format of the DCI is used for scheduling data transmission on multiple transmission points, the terminal device needs to detect multiple PDCCHs.

When the transmission parameter for transmitting the first data includes the subcarrier spacing for transmitting the first data, the subcarrier spacing may be, for example, 15 kHz, 30 kHz, 60 kHz, 120 kHz, 240 kHz, 920 kHz, or any other subcarrier spacings probably used in new radio (NR).

For example, if the subcarrier spacing is less than 60 kHz, the MCS mapping relationship table includes a modulation scheme of 256QAM; if the subcarrier spacing is greater than 60 kHz, the modulation scheme of 256QAM is not included in the MCS mapping table.

In 210, when the transmission parameters used for transmitting the first data are different, different MCS mapping tables to be used may be selected by the terminal device. The MCS mapping tables selected based on different transmission parameters will be specifically described by the following five cases.

Case I

In one embodiment, the transmission parameter includes the transmission pattern used for transmitting the first data.

If the transmission pattern is a first transmission pattern, a first modulation scheme is included in the multiple MCSs in the MCS mapping table selected by the terminal device; and if the transmission pattern is a second transmission pattern, the first modulation scheme is not included in the multiple MCSs in the MCS mapping table selected by the terminal device.

In one embodiment, the first modulation scheme includes, for example, any one of: BPSK with pi/2 offset, 64 QAM, 256 QAM or 1024 QAM.

Optionally, the first transmission pattern is a transmission pattern based on a single antenna port, the second transmission pattern is a transmission pattern based on multiple antenna ports, and the first modulation scheme is binary phase shift keying (BPSK) with pi/2 offset. In one embodiment, the first transmission pattern is a transmission pattern based on multiple antenna ports, the second transmission pattern is a transmission pattern based on a single antenna port, and the first modulation scheme is a modulation scheme with a modulation order higher than 64 quadrature amplitude modulation (QAM). In one embodiment, the first transmission pattern is a transmission pattern based on a single transmission point, the second transmission pattern is a transmission pattern based on multiple transmission points, and the first modulation scheme is a modulation scheme with a modulation order higher than 64 QAM.

For example, if the transmission pattern used for transmitting the first data is a transmission pattern based on a single antenna port, when the terminal device selects the MCS mapping table, the MCS mapping table should satisfy: including a modulation scheme of BPSK with pi/2 offset, but not including a modulation scheme with a modulation order higher than 64 QAM (e.g., 256 QAM and 1024 QAM), and the MCS mapping table at this time may be, for example, an MCS mapping table shown in Table 2. If the transmission pattern used for transmitting the first data is a transmission pattern based on multiple antenna ports, when the terminal device selects the MCS mapping table, the MCS mapping table should satisfy: not including a modulation scheme of BPSK with pi/2 offset, but including a modulation scheme of 256 QAM, and the MCS mapping table at this time may be, for example, an MCS mapping table shown in Table 3.

For another example, if the transmission pattern used for transmitting the first data is a transmission pattern based on a single transmission point, the MCS mapping table selected by the terminal device includes a modulation scheme with a modulation order higher than 64 QAM (e.g., 256 QAM and 1024 QAM). If the transmission pattern used for transmitting the first data is a transmission pattern based on multiple transmission points, the MCS mapping table selected by the terminal device does not include the modulation scheme with a modulation order higher than 64 QAM (e.g., 256 QAM and 1024 QAM).

Case II

In one embodiment, the transmission parameter includes the DCI format of DCI used for scheduling the first data.

If the DCI format of DCI is a first DCI format, a second modulation scheme is included in the multiple MCSs in the MCS mapping table selected by the terminal device; and if the DCI format of DCI is a second DCI format, the second modulation scheme is not included in the multiple MCSs in the MCS mapping table selected by the terminal device.

In one embodiment, the second modulation scheme includes, for example, any one of: BPSK with pi/2 offset, 64 QAM, 256 QAM or 1024 QAM.

In one embodiment, the first DCI format is used for scheduling single-layer data transmission on a single antenna port, the second DCI format is used for scheduling single-layer or multi-layer data transmission on multiple antenna ports, and the second modulation scheme is a BPSK modulation scheme with pi/2 offset.

In one embodiment, the first DCI format is used for scheduling data transmission based on a multiple access mode of DFT-S-OFDM, the second DCI format is used for scheduling data transmission based on a multiple access mode of CP-OFDM, and the second modulation scheme is the BPSK modulation scheme with pi/2 offset.

In one embodiment, the first DCI format is used for scheduling data transmission based on a multiple access mode of CP-OFDM, the second DCI format is used for scheduling data transmission based on a multiple access mode of DFT-S-OFDM, and the second modulation scheme is a modulation scheme with 64 QAM.

For example, if the DCI format of the DCI used for scheduling the first data is DCI format 0, which is used for scheduling single-layer data transmission on a single antenna port, the MCS mapping table selected by the terminal device includes a modulation scheme of BPSK with pi/2 offset, but does not include a modulation scheme with a modulation order higher than 64 QAM (e.g., 256 QAM and 1024 QAM), and the MCS mapping table at this time may be, for example, an MCS mapping table shown in Table 2. If the DCI format of the DCI used for scheduling the first data is DCI format 1, which is used for scheduling data transmission (single-layer data transmission or multi-layer data transmission) on multiple antenna ports, the MCS mapping table selected by the terminal includes a modulation scheme of 256 QAM, and the MCS mapping table at this time may be, for example, an MCS mapping table shown in Table 3.

TABLE 2

| MCS index indicated by the MCS indication information | Modulation Scheme | Code Rate (R × 1024) |
| --- | --- | --- |
| 0 | BPSK | 102 |
| 1 | BPSK | 256 |
| 2 | QPSK | 128 |
| 3 | QPSK | 341 |
| 4 | QPSK | 683 |
| 5 | QPSK | 819 |
| 6 | 16 QAM | 410 |
| ... | ... | ... |
| 30 | 64 QAM | 683 |
| 31 | 64 QAM | 819 |

TABLE 3

| MCS index indicated by the MCS indication information | Modulation Scheme | Code Rate (R × 1024) |
| --- | --- | --- |
| 0 | QPSK | 256 |
| 1 | QPSK | 341 |
| 2 | QPSK | 512 |
| 3 | QPSK | 819 |
| 4 | 16 QAM | 410 |
| 5 | 16 QAM | 683 |
| ... | ... | ... |
| 15 | 64 QAM | 410 |
| 16 | 64 QAM | 512 |
| ... | ... | ... |
| 30 | 256 QAM | 683 |
| 31 | 256 QAM | 819 |

For another example, if the DCI format of the DCI used for scheduling the first data is DCI format 0, which is used for scheduling data transmission based on a multiple access mode of DFT-S-OFDM, the MCS mapping table selected by the terminal device includes a modulation scheme of BPSK with pi/2 offset, but does not include a modulation scheme with 256 QAM. If the DCI format of the DCI used for scheduling the first data is DCI format 1, which is used for scheduling data transmission based on a multiple access mode of CP-OFDM, the MCS mapping table selected by the terminal does not include a modulation scheme of BPSK with pi/2 offset, but includes a modulation scheme of 256 QAM. The MCS mapping table corresponding to DCI format 0 may be, for example, as shown in Table 2, and the MCS mapping table corresponding to DCI format 1 may be, for example, as shown in Table 3.

Case III

In one embodiment, the transmission parameter includes the transmission pattern used for transmitting the first data and the DCI format of DCI used for scheduling the first data.

If the transmission pattern is a third transmission pattern and the DCI format of DCI is a third DCI format, a third modulation scheme is included in the multiple MCSs in the MCS mapping table selected by the terminal device; and if the transmission pattern is not the third transmission pattern and/or the DCI format of DCI is not the third DCI format, the third modulation scheme is not included in the multiple MCSs in the MCS mapping table selected by the terminal device.

In one embodiment, the third modulation scheme includes, for example, any one of: BPSK with pi/2 offset, 64 QAM, 256 QAM or 1024 QAM.

In one embodiment, the third transmission pattern is a transmission pattern based on MIMO, the third DCI format is used for scheduling data transmission on multiple antenna ports, and the third modulation scheme is a modulation scheme with 256 QAM. In one embodiment, the third transmission pattern is a transmission pattern based on a single antenna port, the third DCI format is used for scheduling data transmission based on a multiple access mode of DFT-S-OFDM, and the third modulation scheme is a BPSK modulation scheme with pi/2 offset.

For example, if the transmission pattern used for transmitting the first data is a transmission pattern based on MIMO, and the DCI format of the DCI used for scheduling the first data is DCI format 1, which is used for scheduling data transmission on multiple antenna ports, the MCS mapping table selected by the terminal includes a modulation scheme of 256 QAM. Otherwise (e.g., the first data is transmitted using another transmission pattern, or scheduled using another DCI format even under the same transmission pattern), the MCS mapping table does not include a modulation scheme of 256 QAM.

For another example, if the transmission pattern used for transmitting the first data is a transmission pattern based on a single antenna port, and the DCI format of the DCI used for scheduling the first data is DCI format 0, which is used for scheduling data transmission based on a multiple access mode of DFT-S-OFDM, the MCS mapping table selected by the terminal includes a modulation scheme of BPSK with pi/2 offset. Otherwise (e.g., the first data is transmitted using another transmission pattern, or scheduled using another DCI format even under the same transmission pattern), the MCS mapping table does not include a modulation scheme of BPSK with pi/2 offset.

Case IV

In one embodiment, the transmission parameter includes the transmission pattern used for transmitting the first data and the DCI format of DCI used for scheduling the first data.

If the transmission pattern is a fourth transmission pattern and the DCI format of DCI is a fourth DCI format, a fourth modulation scheme is not included in the multiple MCSs in the MCS mapping table selected by the terminal device; and if the transmission pattern is not the fourth transmission pattern and/or the DCI format of DCI is not the fourth DCI format, the fourth modulation scheme is included in the multiple MCSs in the MCS mapping table selected by the terminal device.

In one embodiment, the fourth modulation scheme includes, for example, any one of: BPSK with pi/2 offset, 64 QAM, 256 QAM or 1024 QAM.

In one embodiment, the fourth transmission pattern is a transmission pattern based on a single antenna port, the fourth DCI format is used for scheduling data transmission based on a multiple access mode of DFT-S-OFDM, and the fourth modulation scheme is a modulation scheme with 256 QAM. In one embodiment, the fourth transmission pattern is a transmission pattern based on MIMO, the fourth DCI format is used for scheduling data transmission based on a multiple access mode of CP-OFDM, and the fourth modulation scheme is a BPSK modulation scheme with pi/2 offset.

For example, if the transmission pattern used for transmitting the first data is a transmission pattern based on a single antenna port, and the DCI format of the DCI used for scheduling the first data is DCI format 0, which is used for scheduling data transmission based on a multiple access mode of DFT-S-OFDM, the MCS mapping table selected by the terminal does not include a modulation scheme of 256 QAM. Otherwise (e.g., the first data is transmitted using another transmission pattern, or scheduled using another DCI format even under the same transmission pattern), the MCS mapping table includes a modulation scheme of 256 QAM.

For another example, if the transmission pattern used for transmitting the first data is a transmission pattern based on MIMO, and the DCI format of the DCI used for scheduling the first data is DCI format 1, which is used for scheduling data transmission based on a multiple access mode of CP-OFDM, the MCS mapping table selected by the terminal does not include a modulation scheme of BPSK with pi/2 offset. Otherwise (e.g., the first data is transmitted using another transmission pattern, or scheduled using another DCI format even under the same transmission pattern), the MCS mapping table includes a modulation scheme of BPSK with pi/2 offset.

Case V

In one embodiment, the transmission parameter includes the multiplexing manner of the first data and uplink control information (UCI).

If the multiplexing manner is that the first data is multiplexed with the UCI in a same time domain resource unit, or the first data is frequency-division multiplexed (FDM) with the UCI, a fifth modulation scheme is not included in the multiple MCSs in the mapping table selected by the terminal device.

The time domain resource unit is, for example, a time slot, a mini time slot or a subframe.

In one embodiment, the fifth modulation scheme includes any one of: BPSK with pi/2 offset, 64 QAM, 256 QAM or 1024 QAM.

In one embodiment, a MCS mapping table selected by the terminal device according to a transmission parameter is different from a MCS mapping table selected by the terminal device according to a different transmission parameter, and in different mapping tables, the target MCS indication information corresponds to different coding rates.

In other words, the code rates in different MCS mapping tables, which are determined by the terminal device according to different transmission parameters, may be different in value.

In one embodiment, a MCS mapping table selected by the terminal device according to a transmission parameter is different from a MCS mapping table selected by the terminal device according to a different transmission parameter, and the different mapping tables include different numbers of MCS indication information.

In other words, different MCS mapping tables, which are determined by the terminal device according to different transmission parameters, may be different in size, that is, different MCS mapping tables may include different numbers of MCSs or different numbers of MCS indication information.

At this time, the number of bits occupied by the MCS indication information carried in the DCI for scheduling the first data may also be different.

For example, for the first transmission pattern and/or the first DCI format, the MCS mapping table selected by the terminal device includes a mapping relationship between 16 possible MCS indexes indicated by the MCS indication information and 16 MCSs that may be used by the first data, and there is a one-to-one correspondence between the 16 MCS indexes and the 16 MCSs. At this time, the size of the MCS mapping table is 16. The MCS indication information in the MCS mapping table may occupy 4 bits. For the second transmission pattern and/or the second DCI format, the MCS mapping table includes a mapping relationship between 32 possible MCS indexes indicated by the MCS indication information and 32 MCSs that may be used for transmitting the first data, and there is a one-to-one correspondence between the 32 MCS indexes and the 32 MCSs. At this time, the size of the MCS mapping table is 32, and the MCS indication information in the MCS mapping table may occupy 5 bits.

In 220, the terminal device determines, according to target MCS indication information carried in the DCI and the MCS mapping table, a target MCS used for performing data processing on the first data.

In 230, the terminal device performs, according to the target MCS, encoding and modulation, or demodulation and decoding, on the first data.

In one embodiment, the terminal device performs channel coding on the first data according to the encoding rate in the MCS, and then modulates the encoded first data according to the modulation scheme in the MCS to obtain a modulated signal. In one embodiment, the terminal device demodulates the first data, as received, according to a modulation manner in the MCS, and then decodes the demodulated first data according to a code rate in the MCS to obtain decoded first data.

In one embodiment, the performing, by the terminal device according to the target MCS, encoding and modulation, or demodulation and decoding, on the first data includes: performing, by the terminal device if the target MCS exceeds a maximum MCS supported by the terminal device, encoding and modulation, or demodulation and decoding, on the first data according to the maximum MCS.

For example, if the terminal device at highest supports a modulation scheme of 64 QAM, but the modulation scheme corresponding to the MCS indication information carried in the DCI is a modulation scheme of 256 QAM, the terminal device uses 64 QAM as the MCS for processing the first data. In one embodiment, if the code rate corresponding to the MCS indication information exceeds the highest code rate supported by the terminal device, the terminal device performs transmission or detection of the first data according to the highest code rate supported by the terminal device.

Therefore, in the embodiment of the present application, the terminal device can select an MCSMCS mapping table suitable for the current transmission scenario according to transmission parameters of the data transmission, such as a transmission pattern, a DCI format, a subcarrier spacing, and a multiplexing manner with the UCI, and effectively determine the MCS used in the current transmission scenario according to the MCS indication information carried in the DCI and the selected MCSMCS mapping table.

FIG. 3 is a schematic flowchart illustrating a data processing method according to an embodiment of the present application. The method shown in FIG. 3 may be performed by a network device, which may be, for example, the network device 10 shown in FIG. 1. As shown in FIG. 3, the data processing method is as follows.

In 310, the network device selects, according to a transmission parameter used for transmitting the first data, an MCS mapping table to be used. The MCS mapping table includes a mapping relationship between multiple MCS indication information and multiple MCSs, and the transmission parameter includes at least one of: a transmission pattern used for transmitting the first data, a downlink control information (DCI) format of DCI used for scheduling the first data, a subcarrier spacing used for transmitting the first data, or a multiplexing manner of the first data and uplink control information (UCI).

In 320, the network device determines, according to the MCS mapping table and a target MCS used for performing data processing on the first data, target MCS indication information carried in the DCI.

In 330, the network device sends the DCI carrying the target MCS indication information to a terminal device.

In 340, the network device performs, according to the target MCS, encoding and modulation, or demodulation and decoding, on the first data.

Therefore, the network device is able to select an MCS mapping table suitable for the current transmission scenario according to transmission parameters of the data transmission, such as a transmission pattern, a DCI format, a subcarrier spacing, a multiplexing manner with the UCI, and the like, and determine the MCS indication information to be sent according to the target MCS used for performing data processing on the first data and the selected MCS mapping table, thereby enabling the terminal device to effectively determine the MCS to be used in the current transmission scenario according to the MCS indication information.

In one embodiment, each of the multiple MCS indication information indicates an MCS index, and multiple MCS indexes indicated by the multiple MCS indication information correspond to the multiple MCSs one-to-one.

In one embodiment, each of the multiple MCSs includes information of a modulation scheme and an encoding rate.

In one embodiment, the transmission pattern used for transmitting the first data includes any one of: a transmission pattern based on a single antenna port, a transmission pattern based on multiple input multiple output (MIMO), a transmission pattern based on multiple antenna ports, a transmission pattern based on a single transmission point, or a transmission pattern based on multiple transmission points.

In one embodiment, the DCI format of DCI used for scheduling the first data includes a DCI format used for scheduling any kind of data transmission including: data transmission on a single antenna port, data transmission at a single transmission layer, data transmission on multiple antenna ports, data transmission at multiple transmission layers, data transmission based on open-loop MIMO, data transmission based on closed-loop precoding, data transmission based on a multiple access mode of discrete Fourier transform spread orthogonal frequency division multiplexing (DFT-S-OFDM), data transmission based on a multiple access mode of cyclic prefix orthogonal frequency division multiplexing (CP-OFDM), data transmission at a single transmission point, or data transmission at multiple transmission points.

In one embodiment, the transmission parameter includes the transmission pattern used for transmitting the first data, if the transmission pattern is a first transmission pattern, a first modulation scheme is included in the multiple MCSs in the MCS mapping table selected by the network device; and if the transmission pattern is a second transmission pattern, the first modulation scheme is not included in the multiple MCSs in the MCS mapping table selected by the network device.

In one embodiment, the first transmission pattern is a transmission pattern based on a single antenna port, the second transmission pattern is a transmission pattern based on multiple antenna ports, and the first modulation scheme is binary phase shift keying (BPSK) with pi/2 offset; or the first transmission pattern is a transmission pattern based on multiple antenna ports, the second transmission pattern is a transmission pattern based on a single antenna port, and the first modulation scheme is a modulation scheme with a modulation order higher than 64 quadrature amplitude modulation (QAM); or the first transmission pattern is a transmission pattern based on a single transmission point, the second transmission pattern is a transmission pattern based on multiple transmission points, and the first modulation scheme is a modulation scheme with a modulation order higher than 64 QAM.

In one embodiment, the transmission parameter includes the DCI format of DCI used for scheduling the first data, if the DCI format of DCI is a first DCI format, a second modulation scheme is included in the multiple MCSs in the MCS mapping table selected by the network device; and if the DCI format of DCI is a second DCI format, the second modulation scheme is not included in the multiple MCSs in the MCS mapping table selected by the network device.

In one embodiment, the first DCI format is used for scheduling single-layer data transmission on a single antenna port, the second DCI format is used for scheduling single-layer or multi-layer data transmission on multiple antenna ports, and the second modulation scheme is a BPSK modulation scheme with pi/2 offset; or the first DCI format is used for scheduling data transmission based on a multiple access mode of DFT-S-OFDM, the second DCI format is used for scheduling data transmission based on a multiple access mode of CP-OFDM, and the second modulation scheme is the BPSK modulation scheme with pi/2 offset; or the first DCI format is used for scheduling data transmission based on a multiple access mode of CP-OFDM, the second DCI format is used for scheduling data transmission based on a multiple access mode of DFT-S-OFDM, and the second modulation scheme is a modulation scheme with 64 QAM.

In one embodiment, the transmission parameter includes the transmission pattern used for transmitting the first data and the DCI format of DCI used for scheduling the first data, if the transmission pattern is a third transmission pattern and the DCI format of DCI is a third DCI format, a third modulation scheme is included in the multiple MCSs in the MCS mapping table selected by the network device; and if the transmission pattern is not the third transmission pattern and/or the DCI format of DCI is not the third DCI format, the third modulation scheme is not included in the multiple MCSs in the MCS mapping table selected by the network device.

In one embodiment, the third transmission pattern is a transmission pattern based on MIMO, the third DCI format is used for scheduling data transmission on multiple antenna ports, and the third modulation scheme is a modulation scheme with 256 QAM; or the third transmission pattern is a transmission pattern based on a single antenna port, the third DCI format is used for scheduling data transmission based on a multiple access mode of DFT-S-OFDM, and the third modulation scheme is a BPSK modulation scheme with pi/2 offset.

In one embodiment, the transmission parameter includes the transmission pattern used for transmitting the first data and the DCI format of DCI used for scheduling the first data, if the transmission pattern is a fourth transmission pattern and the DCI format of DCI is a fourth DCI format, a fourth modulation scheme is not included in the multiple MCSs in the MCS mapping table selected by the network device; if the transmission pattern is not the fourth transmission pattern and/or the DCI format of DCI is not the fourth DCI format, the fourth modulation scheme is included in the multiple MCSs in the MCS mapping table selected by the network device.

In one embodiment, the fourth transmission pattern is a transmission pattern based on a single antenna port, the fourth DCI format is used for scheduling data transmission based on a multiple access mode of DFT-S-OFDM, and the fourth modulation scheme is a modulation scheme with 256 QAM; or the fourth transmission pattern is a transmission pattern based on MIMO, the fourth DCI format is used for scheduling data transmission based on a multiple access mode of CP-OFDM, and the fourth modulation scheme is a BPSK modulation scheme with pi/2 offset.

In one embodiment, the transmission parameter includes the multiplexing manner of the first data and uplink control information (UCI), if the multiplexing manner is that the first data is multiplexed with the UCI in a same time domain resource unit, or the first data is frequency-division multiplexed (FDM) with the UCI, a fifth modulation scheme is not included in the multiple MCSs in the mapping table selected by the network device.

In one embodiment, the fifth modulation scheme includes any one of: BPSK with pi/2 offset, 64 QAM, 256 QAM or 1024 QAM.

In one embodiment, a MCS mapping table selected by the terminal device according to a transmission parameter is different from a MCS mapping table selected by the terminal device according to a different transmission parameter, and in different mapping tables, the target MCS corresponds to different coding rates.

In one embodiment, a MCS mapping table selected by the terminal device according to a transmission parameter is different from a MCS mapping table selected by the terminal device according to a different transmission parameter, and the different mapping tables include different numbers of MCS indication information.

In one embodiment, the performing, by the network device according to the target MCS, encoding and modulation, or demodulation and decoding, on the first data includes: performing, by the network device if the target MCS exceeds a maximum MCS supported by the terminal device, encoding and modulation, or demodulation and decoding, on the first data according to the maximum MCS.

It should be understood that an exemplary process for the network device selecting the MCS mapping table and the exemplary description of the MCS mapping table may refer to the foregoing description of FIG. 2 related to the terminal device, and details are not described herein for brevity.

It should also be understood that the description of the method 200 and the method 300 may be referred to each other, and the method 200 and the method 300 may be used in combination, and for brevity, no further details are provided herein.

It should also be understood that, in various embodiments of the present application, the value of the sequence numbers of the above processes does not mean the order of execution, and the order of execution of each process should be determined by its function and internal logic, and should not constitute any limitation to the implementation of the embodiments in the present application.

FIG. 4 is a block diagram illustrating a terminal device 400 according to an embodiment of the present application. As shown in FIG. 4, the terminal device 400 includes a selecting unit 410, a determining unit 420 and a data processing unit 430.

The selecting unit 410 is configured to select, according to a transmission parameter used for transmitting first data, a modulation coding scheme (MCS) mapping table to be used, the MCS mapping table including a mapping relationship between multiple MCS indication information and multiple MCSs, the transmission parameter including at least one of: a transmission pattern used for transmitting the first data, a downlink control information (DCI) format of DCI used for scheduling the first data, a subcarrier spacing used for transmitting the first data, or a multiplexing manner of the first data and uplink control information (UCI).

The determining unit 420 is configured to determine, according to target MCS indication information carried in the DCI and the MCS mapping table selected by the selecting unit 410, a target MCS used for performing data processing on the first data.

The data processing unit 430 is configured to perform, according to the target MCS determined by the determining unit 420, encoding and modulation, or demodulation and decoding, on the first data.

Therefore, the terminal device is able to select an MCS mapping table suitable for the current transmission scenario according to transmission parameters of the data transmission, such as a transmission pattern, a DCI format, a subcarrier spacing, a multiplexing manner with the UCI, and the like, and effectively determine the MCS used in the current transmission scenario according to the MCS indication information carried in the DCI and the selected MCS mapping table.

In one embodiment, each of the multiple MCS indication information indicates an MCS index, and multiple MCS indexes indicated by the multiple MCS indication information correspond to the multiple MCSs one-to-one.

In one embodiment, each of the multiple MCSs includes information of a modulation scheme and an encoding rate.

In one embodiment, the transmission parameter includes the transmission pattern used for transmitting the first data, and the terminal device further includes a transceiving unit configured to: receive indication information that is sent by a network device using high layer signaling and used for indicating the transmission pattern.

In one embodiment, the transmission parameter includes the DCI format of DCI used for scheduling the first data, and the determining unit 420 is further configured to: perform, based on multiple DCI formats, blind detection on the DCI to determine the DCI format of the DCI.

In one embodiment, the transmission pattern used for transmitting the first data includes any one of: a transmission pattern based on a single antenna port, a transmission pattern based on multiple input multiple output (MIMO), a transmission pattern based on multiple antenna ports, a transmission pattern based on a single transmission point, or a transmission pattern based on multiple transmission points.

In one embodiment, the DCI format of DCI used for scheduling the first data includes a DCI format used for scheduling any kind of data transmission including: data transmission on a single antenna port, data transmission at a single transmission layer, data transmission on multiple antenna ports, data transmission at multiple transmission layers, data transmission based on open-loop MIMO, data transmission based on closed-loop precoding, data transmission based on a multiple access mode of discrete Fourier transform spread orthogonal frequency division multiplexing (DFT-S-OFDM), data transmission based on a multiple access mode of cyclic prefix orthogonal frequency division multiplexing (CP-OFDM), data transmission at a single transmission point, or data transmission at multiple transmission points.

In one embodiment, the transmission parameter includes the transmission pattern used for transmitting the first data, if the transmission pattern is a first transmission pattern, a first modulation scheme is included in the multiple MCSs in the MCS mapping table selected by the terminal device; and if the transmission pattern is a second transmission pattern, the first modulation scheme is not included in the multiple MCSs in the MCS mapping table selected by the terminal device.

In one embodiment, the first transmission pattern is a transmission pattern based on a single antenna port, the second transmission pattern is a transmission pattern based on multiple antenna ports, and the first modulation scheme is binary phase shift keying (BPSK) with pi/2 offset.

In one embodiment, the first transmission pattern is a transmission pattern based on multiple antenna ports, the second transmission pattern is a transmission pattern based on a single antenna port, and the first modulation scheme is a modulation scheme with a modulation order higher than 64 quadrature amplitude modulation (QAM).

In one embodiment, the first transmission pattern is a transmission pattern based on a single transmission point, the second transmission pattern is a transmission pattern based on multiple transmission points, and the first modulation scheme is a modulation scheme with a modulation order higher than 64 QAM.

In one embodiment, the transmission parameter includes the DCI format of DCI used for scheduling the first data, if the DCI format of DCI is a first DCI format, a second modulation scheme is included in the multiple MCSs in the MCS mapping table selected by the terminal device; and if the DCI format of DCI is a second DCI format, the second modulation scheme is not included in the multiple MCSs in the MCS mapping table selected by the terminal device.

In one embodiment, the first DCI format is used for scheduling single-layer data transmission on a single antenna port, the second DCI format is used for scheduling single-layer or multi-layer data transmission on multiple antenna ports, and the second modulation scheme is a BPSK modulation scheme with pi/2 offset.

In one embodiment, the first DCI format is used for scheduling data transmission based on a multiple access mode of DFT-S-OFDM, the second DCI format is used for scheduling data transmission based on a multiple access mode of CP-OFDM, and the second modulation scheme is the BPSK modulation scheme with pi/2 offset.

In one embodiment, the first DCI format is used for scheduling data transmission based on a multiple access mode of CP-OFDM, the second DCI format is used for scheduling data transmission based on a multiple access mode of DFT-S-OFDM, and the second modulation scheme is a modulation scheme with 64 QAM.

In one embodiment, the transmission parameter includes the transmission pattern used for transmitting the first data and the DCI format of DCI used for scheduling the first data, if the transmission pattern is a third transmission pattern and the DCI format of DCI is a third DCI format, a third modulation scheme is included in the multiple MCSs in the MCS mapping table selected by the terminal device; and if the transmission pattern is not the third transmission pattern and/or the DCI format of DCI is not the third DCI format, the third modulation scheme is not included in the multiple MCSs in the MCS mapping table selected by the terminal device.

In one embodiment, the third transmission pattern is a transmission pattern based on MIMO, the third DCI format is used for scheduling data transmission on multiple antenna ports, and the third modulation scheme is a modulation scheme with 256 QAM.

In one embodiment, the third transmission pattern is a transmission pattern based on a single antenna port, the third DCI format is used for scheduling data transmission based on a multiple access mode of DFT-S-OFDM, and the third modulation scheme is a BPSK modulation scheme with pi/2 offset.

In one embodiment, the transmission parameter includes the transmission pattern used for transmitting the first data and the DCI format of DCI used for scheduling the first data, if the transmission pattern is a fourth transmission pattern and the DCI format of DCI is a fourth DCI format, a fourth modulation scheme is not included in the multiple MCSs in the MCS mapping table selected by the terminal device; if the transmission pattern is not the fourth transmission pattern and/or the DCI format of DCI is not the fourth DCI format, the fourth modulation scheme is included in the multiple MCSs in the MCS mapping table selected by the terminal device.

In one embodiment, the fourth transmission pattern is a transmission pattern based on a single antenna port, the fourth DCI format is used for scheduling data transmission based on a multiple access mode of DFT-S-OFDM, and the fourth modulation scheme is a modulation scheme with 256 QAM.

In one embodiment, the fourth transmission pattern is a transmission pattern based on MIMO, the fourth DCI format is used for scheduling data transmission based on a multiple access mode of CP-OFDM, and the fourth modulation scheme is a BPSK modulation scheme with pi/2 offset.

In one embodiment, the transmission parameter includes the multiplexing manner of the first data and uplink control information (UCI), if the multiplexing manner is that the first data is multiplexed with the UCI in a same time domain resource unit, or the first data is frequency-division multiplexed (FDM) with the UCI, a fifth modulation scheme is not included in the multiple MCSs in the mapping table selected by the terminal device.

In one embodiment, the fifth modulation scheme includes any one of: BPSK with pi/2 offset, 64 QAM, 256 QAM or 1024 QAM.

In one embodiment, a MCS mapping table selected by the terminal device according to a transmission parameter is different from a MCS mapping table selected by the terminal device according to a different transmission parameter, and in different mapping tables, the target MCS indication information corresponds to different coding rates.

In one embodiment, a MCS mapping table selected by the terminal device according to a transmission parameter is different from a MCS mapping table selected by the terminal device according to a different transmission parameter, and the different mapping tables include different numbers of MCS indication information.

In one embodiment, the performing, by the terminal device according to the target MCS, encoding and modulation, or demodulation and decoding, on the first data includes: performing, by the terminal device if the target MCS exceeds a maximum MCS supported by the terminal device, encoding and modulation, or demodulation and decoding, on the first data according to the maximum MCS.

It should be understood that the terminal device 400 can perform the corresponding operations performed by the terminal device in the foregoing method embodiments, and details are not described herein for brevity.

Figure 5:
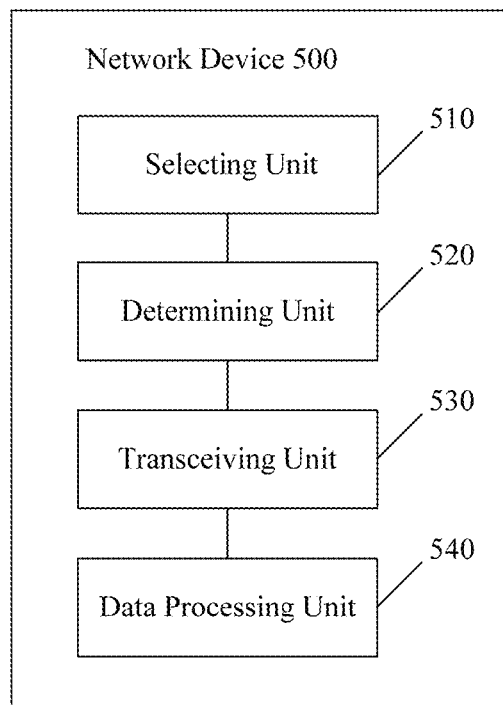
FIG. 5 is a block diagram illustrating a network device according to an embodiment of the present application.

FIG. 5 is a block diagram illustrating a network device 500 according to an embodiment of the present application. As shown in FIG. 5, the network device 500 includes a selecting unit 510, a determining unit 520, a transceiving unit 530 and a data processing unit 540.

The selecting unit 510 is configured to select, according to a transmission parameter used for transmitting first data, a modulation coding scheme (MCS) mapping table to be used, the MCS mapping table including a mapping relationship between multiple MCS indication information and multiple MCSs, the transmission parameter including at least one of: a transmission pattern used for transmitting the first data, a downlink control information (DCI) format of DCI used for scheduling the first data, a subcarrier spacing used for transmitting the first data, or a multiplexing manner of the first data and uplink control information (UCI).

The determining unit 520 is configured to determine, according to the MCS mapping table selected by the selecting unit 510 and a target MCS used for performing data processing on the first data, target MCS indication information carried in the DCI.

The transceiving unit 530 is configured to send to a terminal device the DCI carrying the target MCS indication information determined by the determining unit 520.

The data processing unit 540 is configured to perform, according to the target MCS determined by the determining unit 520, encoding and modulation, or demodulation and decoding, on the first data.

Therefore, the network device is able to select an MCS mapping table suitable for the current transmission scenario according to transmission parameters of the data transmission, such as a transmission pattern, a DCI format, a subcarrier spacing, a multiplexing manner with the UCI, and the like, and determine the MCS indication information to be sent according to the target MCS used for performing data processing on the first data and the selected MCS mapping table, thereby enabling the terminal device to effectively determine the MCS to be used in the current transmission scenario according to the MCS indication information.

In one embodiment, each of the multiple MCS indication information indicates an MCS index, and multiple MCS indexes indicated by the multiple MCS indication information correspond to the multiple MCSs one-to-one.

In one embodiment, each of the multiple MCSs includes information of a modulation scheme and an encoding rate.

In one embodiment, the transmission pattern used for transmitting the first data includes any one of: a transmission pattern based on a single antenna port, a transmission pattern based on multiple input multiple output (MIMO), a transmission pattern based on multiple antenna ports, a transmission pattern based on a single transmission point, or a transmission pattern based on multiple transmission points.

In one embodiment, the DCI format of DCI used for scheduling the first data includes a DCI format used for scheduling any kind of data transmission including: data transmission on a single antenna port, data transmission at a single transmission layer, data transmission on multiple antenna ports, data transmission at multiple transmission layers, data transmission based on open-loop MIMO, data transmission based on closed-loop precoding, data transmission based on a multiple access mode of discrete Fourier transform spread orthogonal frequency division multiplexing (DFT-S-OFDM), data transmission based on a multiple access mode of cyclic prefix orthogonal frequency division multiplexing (CP-OFDM), data transmission at a single transmission point, or data transmission at multiple transmission points.

In one embodiment, the transmission parameter includes the transmission pattern used for transmitting the first data, if the transmission pattern is a first transmission pattern, a first modulation scheme is included in the multiple MCSs in the MCS mapping table selected by the network device; and if the transmission pattern is a second transmission pattern, the first modulation scheme is not included in the multiple MCSs in the MCS mapping table selected by the network device.

In one embodiment, the transmission parameter includes the DCI format of DCI used for scheduling the first data, if the DCI format of DCI is a first DCI format, a second modulation scheme is included in the multiple MCSs in the MCS mapping table selected by the network device; and if the DCI format of DCI is a second DCI format, the second modulation scheme is not included in the multiple MCSs in the MCS mapping table selected by the network device.

In one embodiment, the transmission parameter includes the transmission pattern used for transmitting the first data and the DCI format of DCI used for scheduling the first data, if the transmission pattern is a third transmission pattern and the DCI format of DCI is a third DCI format, a third modulation scheme is included in the multiple MCSs in the MCS mapping table selected by the network device; and if the transmission pattern is not the third transmission pattern and/or the DCI format of DCI is not the third DCI format, the third modulation scheme is not included in the multiple MCSs in the MCS mapping table selected by the network device.

In one embodiment, the transmission parameter includes the transmission pattern used for transmitting the first data and the DCI format of DCI used for scheduling the first data, if the transmission pattern is a fourth transmission pattern and the DCI format of DCI is a fourth DCI format, a fourth modulation scheme is not included in the multiple MCSs in the MCS mapping table selected by the network device; if the transmission pattern is not the fourth transmission pattern and/or the DCI format of DCI is not the fourth DCI format, the fourth modulation scheme is included in the multiple MCSs in the MCS mapping table selected by the network device.

In one embodiment, the transmission parameter includes the multiplexing manner of the first data and uplink control information (UCI), if the multiplexing manner is that the first data is multiplexed with the UCI in a same time domain resource unit, or the first data is frequency-division multiplexed (FDM) with the UCI, a fifth modulation scheme is not included in the multiple MCSs in the mapping table selected by the network device.

In one embodiment, a MCS mapping table selected by the terminal device according to a transmission parameter is different from a MCS mapping table selected by the terminal device according to a different transmission parameter, and in different mapping tables, the target MCS corresponds to different coding rates.

In one embodiment, a MCS mapping table selected by the terminal device according to a transmission parameter is different from a MCS mapping table selected by the terminal device according to a different transmission parameter, and the different mapping tables include different numbers of MCS indication information.

In one embodiment, the data processing unit 540 is exemplarily configured to: perform, if the target MCS exceeds a maximum MCS supported by the terminal device, encoding and modulation, or demodulation and decoding, on the first data according to the maximum MCS.

It should be understood that the network device 500 can perform the corresponding operations performed by the network device in the foregoing method embodiments, and details are not described herein for brevity.

Figure 6:
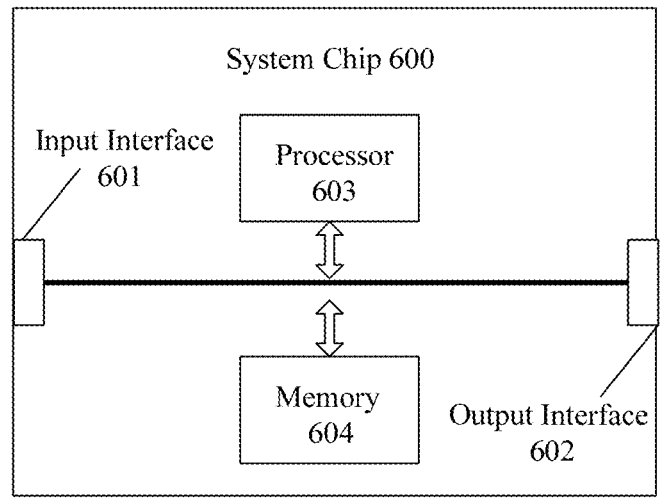
FIG. 6 is a schematic structural diagram illustrating a system chip according to an embodiment of the present application.

FIG. 6 is a schematic structural diagram illustrating a system chip according to an embodiment of the present application. The system chip 600 of FIG. 6 includes an input interface 601, an output interface 602, a processor 603, and a memory 604 that can be connected by an internal communication connection line. The processor 603 is configured to execute codes in the memory 604.

In one embodiment, when the codes are executed, the processor 603 can implement the method 200 performed by the terminal device in the above method embodiments. For the sake of brevity, it will not be repeated herein.

In one embodiment, when the codes are executed, the processor 603 can implement the method 300 performed by the network device in the above method embodiments. For the sake of brevity, it will not be repeated herein.

Figure 7:
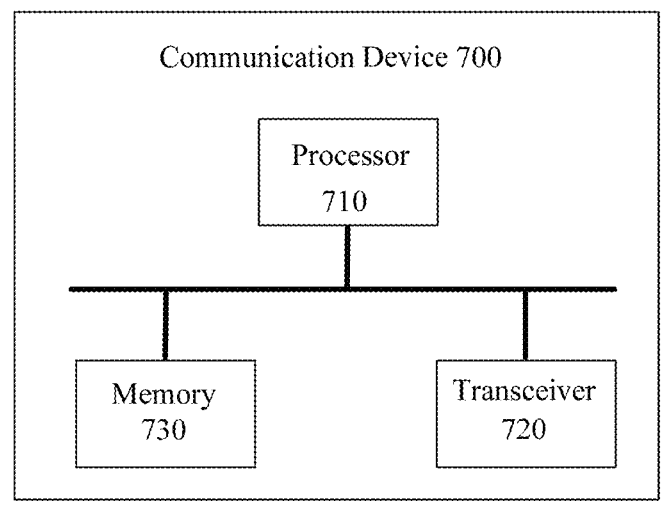
FIG. 7 is a schematic structural diagram illustrating a communication device according to an embodiment of the present application.

FIG. 7 is a schematic structural diagram illustrating a communication device according to an embodiment of the present application. As shown in FIG. 7, the communication device includes a processor 710, a transceiver 720, and a memory 730. In one embodiment, the processor 710, the transceiver 720, and the memory 730 communicate with each other through an internal connection path. The memory 730 is configured to store instructions, and the processor 710 is configured to execute the instructions stored by the memory 730, thereby controlling the transceiver 720 to receive signals or transmit signals.

In one embodiment, the processor 710 may invoke the program codes stored in the memory 730 to perform the corresponding operations of the terminal device in the method embodiments. For brevity, details are not described herein.

In one embodiment, the processor 710 may invoke the program codes stored in the memory 730 to perform the corresponding operations of the network device in the method embodiment. For brevity, details are not described herein.

It should be understood that the processor in the embodiments of the present application may be an integrated circuit chip with signal processing capability. In an implementation process, each step of the foregoing method embodiments may be completed through an integrated logic circuit of hardware or through instructions in a form of software in the processor. The processor may be a general-purpose processor, a digital signal processor (DSP), an application specific integrated circuit (ASIC), a field programmable gate array (FPGA), other programming logic devices, discrete gates or transistor logic devices, discrete hardware components, or the like. The methods, steps, and logical block diagrams disclosed in the embodiments of the present application can be implemented or executed. The general purpose processor may be a microprocessor, the processor may also be any conventional processor or the like. The steps of the methods disclosed in the embodiments of the present application may be directly implemented by the hardware decoding processor, or may be performed by a combination of hardware and software modules in the decoding processor. The software module may be located in a conventional storage medium such as random access memory, flash memory, read only memory, programmable read only memory or electrically erasable programmable memory, registers, and the like. The storage medium is located in the memory, and the processor reads the information in the memory and combines the hardware thereof to complete the steps of the above method.

It is to be understood that the memory in the embodiments of the present application may be a volatile memory or a non-volatile memory, or may include both volatile and non-volatile memory. The non-volatile memory may be a read-only memory (ROM), a programmable read only memory (PROM), an erasable programmable read only memory (Erasable PROM, EPROM), or an electric Erase programmable read only memory (EEPROM) or flash memory. The volatile memory may be a Random Access Memory (RAM) that acts as an external cache. By way of example without limitation, many forms of RAM are available, such as static random access memory (SRAM), dynamic random access memory (DRAM), synchronous dynamic random access memory (Synchronous DRAM, SDRAM), Double Data Rate SDRAM (DDR SDRAM), Enhanced Synchronous Dynamic Random Access Memory (ESDRAM), Synchronous Connection Dynamic Random Access Memory (Synchlink DRAM, SLDRAM) and direct memory bus random access memory (DR RAM). It should be noted that the memories of the systems and methods described herein are intended to include, without being limited to, these and any other suitable types of memory.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods to implement the described functions for each particular application, but such implementation should not be considered to go beyond the scope of the present application.

A person skilled in the art can clearly understand that, for the convenience and brevity of the description, the specific working process of the system, the device and the unit described above can refer to the corresponding process in the foregoing method embodiments, and details are not described herein.

In the several embodiments provided by the present application, it should be understood that the disclosed systems, devices, and methods may be implemented in other manners. For example, the device embodiments described above are merely illustrative. For example, the division of the unit is only a logical function division. In actual implementation, there may be another division manner, for example, multiple units or components may be combined or may be integrated into another system, or some features may be ignored or not executed. In addition, the mutual coupling or direct coupling or communication connection shown or discussed may be an indirect coupling or communication connection through some interface, the indirect coupling or communication connection between devices or units may be in an electrical, mechanical or other form.

The units described as separate components may be or may not be physically separated, and the components displayed as units may be or may not be physical units, that is, may be located in one place, or may be distributed to multiple network units. Some or all of the units may be selected according to actual needs to achieve the purpose of the solution of the embodiment.

In addition, each functional unit in each embodiment of the present application may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution of the present application, which is essential or contributes to the prior art, or a part of the technical solution, may be embodied in the form of a software product, which is stored in a storage medium, including some instructions causing a computer device (which may be a personal computer, server, or network device, etc.) to perform all or part of the steps of the methods described in various embodiments of the present application. The foregoing storage medium includes: a U disk, a mobile hard disk, a read-only memory (ROM), a random access memory (RAM), a magnetic disk, or an optical disk, and the like.

The foregoing is only a specific embodiment of the present application, but the protection scope of the present application is not limited thereto, and any person skilled in the art can easily conceive changes or substitutions within the technical scope disclosed in the present application, which should be covered by the protection scope of this application. Therefore, the protection scope of the present application should be determined by the scope of the claims.

What is claimed is:

1. A data processing method, comprising:
   obtaining, by a terminal device, downlink control information (DCI);
   determining, by the terminal device, a DCI format of the DCI from a first DCI format and a second DCI format;
   determining, by the terminal device, a modulation coding scheme (MCS) mapping table according to the determined DCI format and a mapping relationship between different DCI formats and different MCS mapping tables; and
   determining, by the terminal device, multiple MCSs according to multiple MCS indication information in the DCI and the determined MCS mapping table;
   wherein a MCS mapping table obtained by the terminal device according to the first DCI format is different from a MCS mapping table obtained by the terminal device according to the second DCI format, and in the different mapping tables, at least a part of coding rates corresponding to same MCS indexes are different.

2. The method according to claim 1, wherein each of the multiple MCS indication information indicates an MCS index, and multiple MCS indexes indicated by the multiple MCS indication information correspond to the multiple MCSs one-to-one.

3. The method according to claim 1, wherein each of the multiple MCSs comprises information of a modulation scheme and an encoding rate.

4. The method according to claim 3, wherein the different mapping tables include different numbers of MCS indication information.

5. The method according to claim 1, further comprising:
   performing, by the terminal device according to the MCS, encoding and modulation, or demodulation and decoding, on the data.

6. The method according to claim 1, wherein the first DCI format comprises: DCI format 0 or DCI format 1.

7. The method according to claim 1, wherein:
   when determining the DCI format of the DCI is the first DCI format, the MCS mapping table comprises 256 QAM modulation scheme;
   when determining the DCI format of the DCI is the second DCI format, the MCS mapping table does not comprise 256 QAM modulation scheme.

8. A terminal device, comprising:
   a processor, a transceiver, and a memory communicate with each other through an internal connection path, wherein:
   the memory is configured to store instructions; and
   the processor is configured to, when executing the instructions stored by the memory, perform a data processing method, the method comprising:
   obtaining downlink control information (DCI);
   determining a DCI format of the DCI from a first DCI format and a second DCI format;
   determining a modulation coding scheme (MCS) mapping table according to the determined DCI format and a mapping relationship between different DCI formats and different MCS mapping tables; and
   determining multiple MCSs according to multiple MCS indication information in the DCI and the determined MCS mapping table;
   wherein a MCS mapping table obtained by the terminal device according to the first DCI format is different from a MCS mapping table obtained by the terminal device according to the second DCI format, and in the different mapping tables, at least a part of coding rates corresponding to same MCS indexes are different.

9. The terminal device according to claim 8, wherein each of the multiple MCS indication information indicates an MCS index, and multiple MCS indexes indicated by the multiple MCS indication information correspond to the multiple MCSs one-to-one.

10. The terminal device according to claim 8, wherein each of the multiple MCSs comprises information of a modulation scheme and an encoding rate.

11. The terminal device according to claim 10, wherein the different mapping tables include different numbers of MCS indication information.

12. The terminal device according to claim 8, wherein the processor is further configured to:
    performing, according to the MCS, encoding and modulation, or demodulation and decoding, on the data.

13. The terminal device according to claim 8, wherein the first DCI format comprises: DCI format 0 or DCI format 1.

14. The terminal device according to claim 8, wherein:
    when determining the DCI format of the DCI is the first DCI format, the MCS mapping table comprises 256 QAM modulation scheme;

when determining the DCI format of the DCI is the second DCI format, the MCS mapping table does not comprise 256 QAM modulation scheme.

\* \* \* \* \*